(12) United States Patent
Qian (10) Patent No.: US 8,170,521 B2
(45) Date of Patent: May 1, 2012

(54) METHOD AND APPARATUS FOR SAMPLING RF SIGNALS

(75) Inventor: Xuecheng Qian, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 820 days.

(21) Appl. No.: 12/162,175

(22) PCT Filed: Jan. 25, 2007

(86) PCT No.: PCT/IB2007/050261
§ 371 (c)(1),
(2), (4) Date: Jul. 25, 2008

(87) PCT Pub. No.: WO2007/086020
PCT Pub. Date: Aug. 2, 2007

(65) Prior Publication Data
US 2009/0017785 A1 Jan. 15, 2009

(30) Foreign Application Priority Data

Jan. 27, 2006 (CN) .......................... 2006 1 0006735

(51) Int. Cl.
*H04B 1/10* (2006.01)
(52) U.S. Cl. ........................................ 455/307; 455/313
(58) Field of Classification Search .................. 455/296, 455/307, 313–334
See application file for complete search history.

(56) References Cited

U.S. PATENT DOCUMENTS

| 5,640,698 A | 6/1997 | Shen et al. |
| 6,545,728 B1 * | 4/2003 | Patel et al. ................. 455/150.1 |
| 2002/0025007 A1 * | 2/2002 | Ohashi .......................... 455/307 |
| 2002/0173341 A1 * | 11/2002 | Abdelmonem et al. ...... 455/296 |
| 2004/0146127 A1 | 7/2004 | Kent et al. |
| 2008/0143580 A1 * | 6/2008 | Glazko et al. ................. 455/307 |

OTHER PUBLICATIONS

Muhammad K et al; "15.1—A Discrete-Time Bluetooth Receiver in a 0.13/SPL MU/M Digital CMOS Process". Solid-State Circuits Conference, 2004. Digest of Technical Papers. ISSCC. 2004 IEEE International San Francisco, CA, USA. Feb. 15-19, 2004, Piscataway, NJ, USA. pp. 268-277.

* cited by examiner

*Primary Examiner* — Lana N Le
(74) *Attorney, Agent, or Firm* — Howison & Arnott, L.L.P.

(57) ABSTRACT

The invention provides a method and apparatus used in a receiver for sampling RF signals, particularly to provide a method and apparatus for greatly decrease the sampling rate performed in RF band. The invention provides an apparatus for sampling a RF signal including a plurality of interference frequency components and a useful frequency component, comprising: a filtering unit for filtering out at least one preset interference frequency component from the RF signal to generate a notch-filtered RF signal; a sampling unit for sampling the notch-filtered RF signal at a preset sampling rate to generate a discrete analog signal. The sampling unit can be implemented by a plurality of notch filters. RF sampling can be simply and conveniently implemented by using the method and apparatus according the invention, and the sampling rate can be decreased to about 1/N of the carrier frequency of the useful frequency component, which is much lower than the sampling rate in existing RF sampling scheme. The method and apparatus according the invention can greatly decrease power dissipation when sampling.

12 Claims, 9 Drawing Sheets

METHOD AND APPARATUS FOR SAMPLING RF SIGNALS

FIELD OF THE INVENTION

The present invention relates to a wireless communication system, and more particularly, to a method and apparatus for sampling RF signals in a wireless communication system.

BACKGROUND OF THE INVENTION

With the rapid development of wireless communication systems, wireless communication apparatuses become more and more complicated and miniaturized. Digital signal processing techniques have inherent advantages in a complex mathematical operation, such as flexible mathematical transformation, strong computing capability, ease for implementation and the like. On the other hand, many functions can be integrated in an integrated chip by using digital signal processing techniques, so as to reduce size of apparatuses. Thus, the trend for wireless communication systems is to implement more functions by using digital signal processing techniques instead of analog signal processing techniques.

RF sampling is an important research subject in various schemes in which digital signal processing techniques are used in RF domain. In traditional Heterodyne receivers, zero IF receivers and low IF receivers, sampling and quantization are generally completed in baseband or low IF band, and thus many functions must be completed in analog domain. On the contrary, RF sampling is sampling RF signals before down conversion, such that a continuous-amplitude and continuous-time RF signal is transformed into a continuous-amplitude and discrete-time signal. RF sampling has several advantages. First, more functions can be implemented by using digital signal processing techniques; Second, more functions can be integrated in an integrated chip so as to employ more and more advanced integrated chip processing techniques; Third, the functions completed after RF sampling and prior to a digital signal process unit, such as down-converting, subsampling, filtering, analog-digital converting and the like, can be implemented by using discrete-time signal processing techniques. In general, processing discrete-time signal is much easier than processing continuous-time signal.

Figure 1:
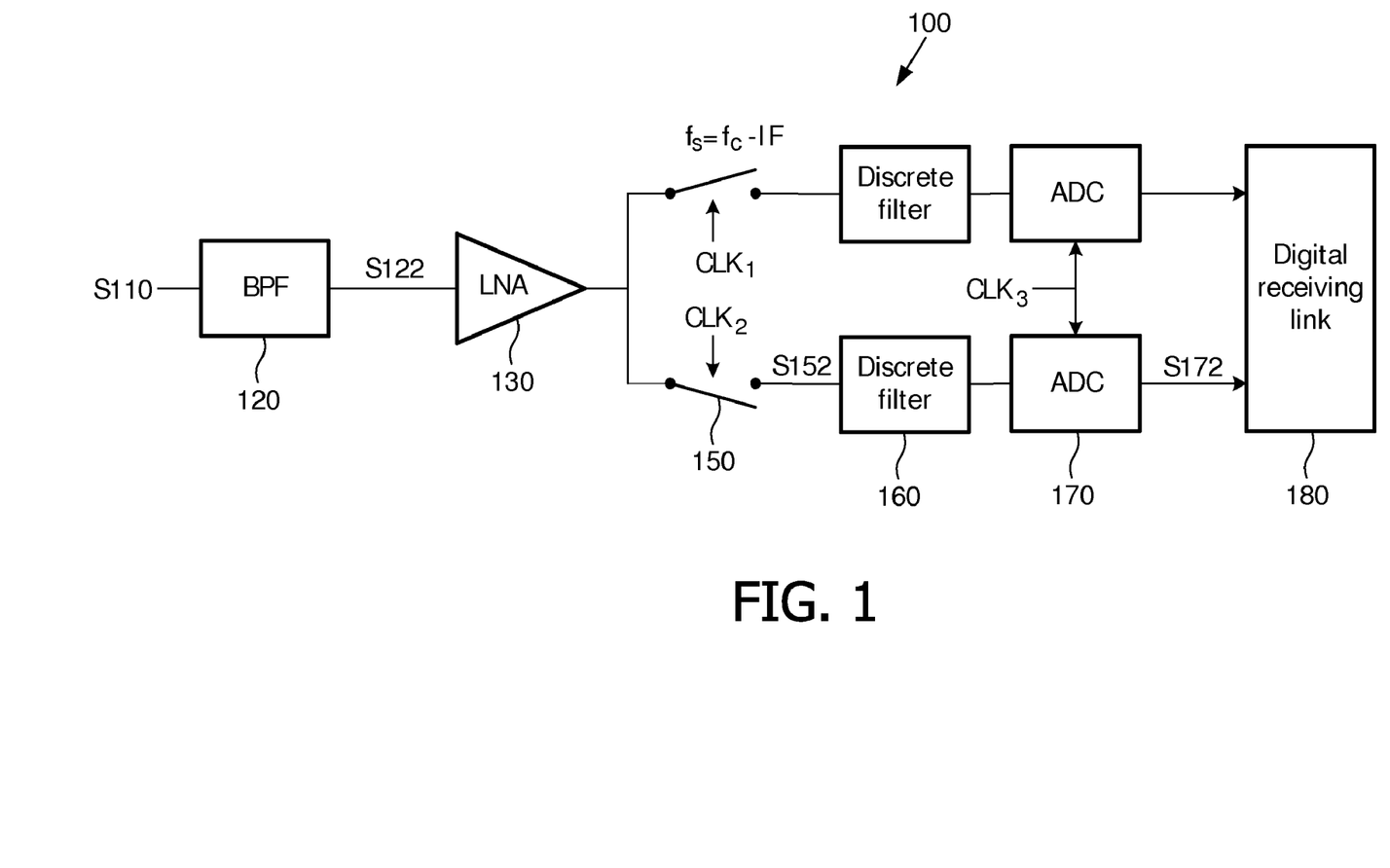
FIG. 1 is a schematic diagram showing a receiver with existed RF sampling scheme.

Texas Instruments proposes a receiver architecture with RF sampling on the proceeding of IEEE Solid State Circuit, 2004. To facilitate description, FIG. 1 is a simplified diagram showing this receiver architecture. In a receiver 100, a RF signal S110 is transferred to a RF bandpass filter (BPF) 120 to generate a bandpass-filtered RF signal. The bandpass-filtered RF signal S122 is amplified by a LNA (Low Noise Amplifier) to improve signal to noise ratio. The bandpass-filtered RF signal S122 is sampled by a sampling unit 150 and transformed into a discrete analog signal S152. Thereafter, a discrete filter 160 and an analog-digital converter 170 transform the discrete analog signal into a digital signal S172 for being processed by a subsequent digital receiving link unit 180.

In FIG. 1, the sampling is completed in RF band. However, such a method has a drawback, i.e., the sampling rate is too high. For example, the sampling rate is about 2400 MHz for Bluetooth and WLAN device. In general, the higher the sampling rate, the higher the power dissipation, and the more complicated the design of a sampling unit. Therefore, it is necessary to solve the problem that the sampling rate is too high.

A way of solving this problem is to employ a high-performance RF bandpass filter BPF whose bandwidth is approximate to the band of a modulated signal. However, this RF bandpass filter BPF is generally bulky and costly, and it is also difficult to achieve a BPF with a narrow bandwidth. Thus, it is difficult to use such a BPF in mobile equipment, particularly in a hand-held device. In a practical system, it is difficult to form a BPF whose bandwidth is very narrow and accurate by connecting a plurality of wide-bandwidth BPF in series due to the limitation of performance, size, and power dissipation.

Therefore, it is necessary to solve the problem that RF sampling rate is too high in a simple and easy way.

SUMMARY OF THE INVENTION

An object of the invention is to provide a method and apparatus for sampling RF signals in a receiver, particularly to provide a method and apparatus for greatly decrease the sampling rate at which the sampling is performed in RF band.

According to the object mentioned above, in one embodiment of the invention, there is provided a device for sampling a RF signal comprising a plurality of interference frequency components and a useful frequency component, the device comprises:

a filtering unit for filtering out at least one predefined interference frequency component from the RF signal to generate a notch-filtered RF signal;

a sampling unit for sampling the notch-filtered RF signal at a predefined sampling rate to generate a discrete analog signal.

The difference value of a center frequency of the filtered-out predefined interference frequency component and an intermediate frequency is a multiple of the sampling rate, wherein the intermediate frequency is a zero frequency or a predefined low IF, the predefined low IF being much lower than the center frequency of the useful frequency component. The sampling unit can be implemented by a plurality of notch filters.

According to the object mentioned above, in one embodiment of the invention, there is provided a method for sampling a RF signal comprising a plurality of interference frequency components and a useful frequency component, the method comprises the steps of:

(a) filtering out at least one predefined interference frequency component from the RF signal to generate a notch-filtered RF signal;

(b) sampling the notch-filtered RF signal at a predefined sampling rate to generate a discrete analog signal.

The method according the invention can avoid the aliasing of some of interference frequency components into the useful frequency component in the subsequent sampling process by filtering out interference frequency components before sampling. The center frequencies of these filtered-out interference frequency components are equal to the sum of a multiple of the sampling rate and the intermediate frequency. For other frequency components whose center frequencies are not equal to the sum of a multiple of the sampling rate and the intermediate frequency, they do not need to be filtered out because there is no aliasing into the useful frequency component due to them. Thus, the number of sampling units required for this method is limited. Moreover, the number of the required filtering units can be further decreased by combining with RF bandpass filter BPF preceding the filtering unit by which the RF signal is first bandpass filtered to suppress out-of-band interferences of the RF band at which the useful frequency component.

Since it is easy to implement a plurality of RF notch filters and the number of the required RF filter is limited, RF sampling can be simply and conveniently implemented by using the method and apparatus according the invention, and the sampling rate can be decreased to about 1/N of the carrier frequency of the useful frequency component, which is much lower than the sampling rate in existing RF sampling scheme. The method and apparatus according the invention can greatly decrease power dissipation at the time of sampling.

Other objects and effects of the present invention will become more apparent from the following description and the appended claims when taken in conjunction with the accompanying drawings as well as more comprehensive understanding of the present invention.

BRIEF DESCRIPTION OF THE DRAWINGS

The same and similar reference number refers to the same and similar feature and function in all the drawings.

DETAIL DESCRIPTION OF THE INVENTION

The technical method of the present invention will be described below in detail from the following embodiments, taken in conjunction with the accompanying drawings.

Figure 2:
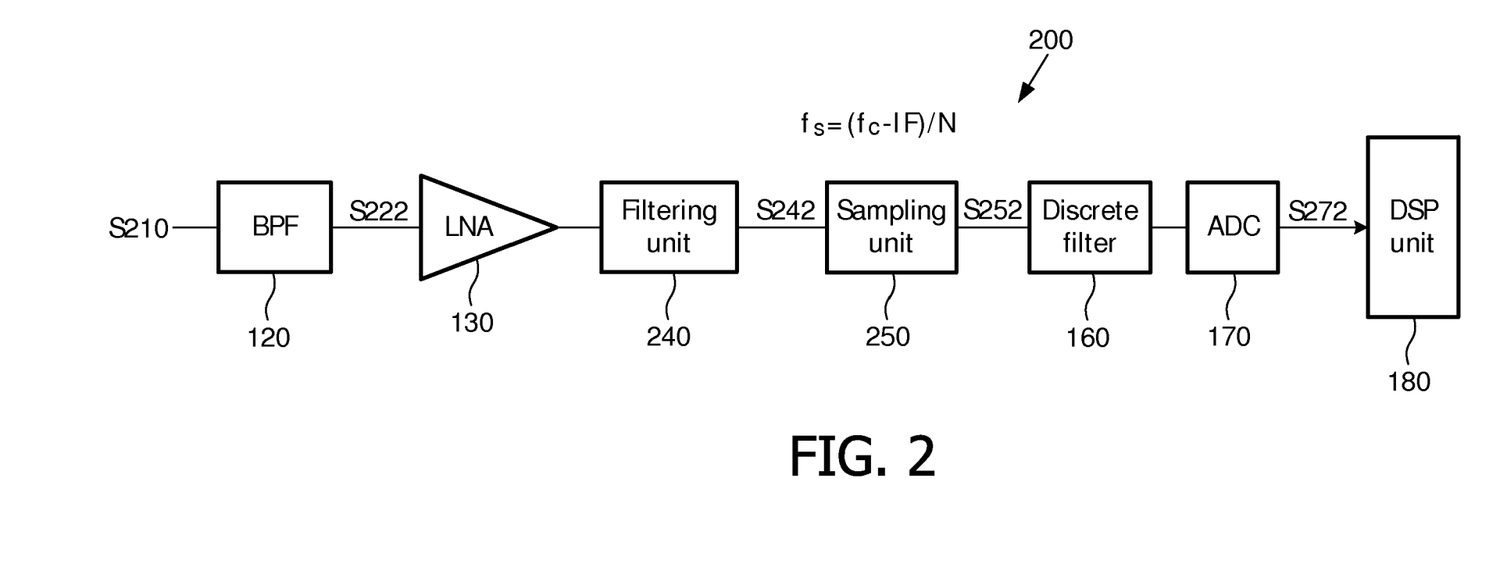
FIG. 2 depicts a schematic diagram showing a receiver with the RF sampling method according to one embodiment of the present invention.

FIG. 2 is a schematic diagram showing a receiver with the RF sampling method according to one embodiment of the present invention. The receiver bandpass filters a RF signal S210 with a BPF 120 to obtain a bandpass-filtered signal S222 which is amplified by a LNA 130 and then transferred to a filtering unit 240 for filtering out at least one predefined interference frequency component from the RF signal S210; the output signal S242 from the filtering unit 240 is a notch-filtered RF signal, and, after being sampled by a sampling unit 250, it is transformed into a discrete analog signal S252; after being processed by a discrete filter 160 and an analog-to-digital converter 170, S252 is transformed into a digital signal S272; S272 is subsequently processed by a digital signal processing unit 280. The sampling rate of the sampling unit 250 can be much lower than that of the existing RF sampling scheme by incorporating the filtering unit 240.

In a practical system, it is difficult to completely filter out a frequency component having a certain bandwidth, thus filtering an interference frequency component by the proposed filtering unit in the present invention should be considered as filtering or suppressing the interference frequency component such that it will not affect or has nonsignificant effect on the subsequent sampling process.

Figure 3:
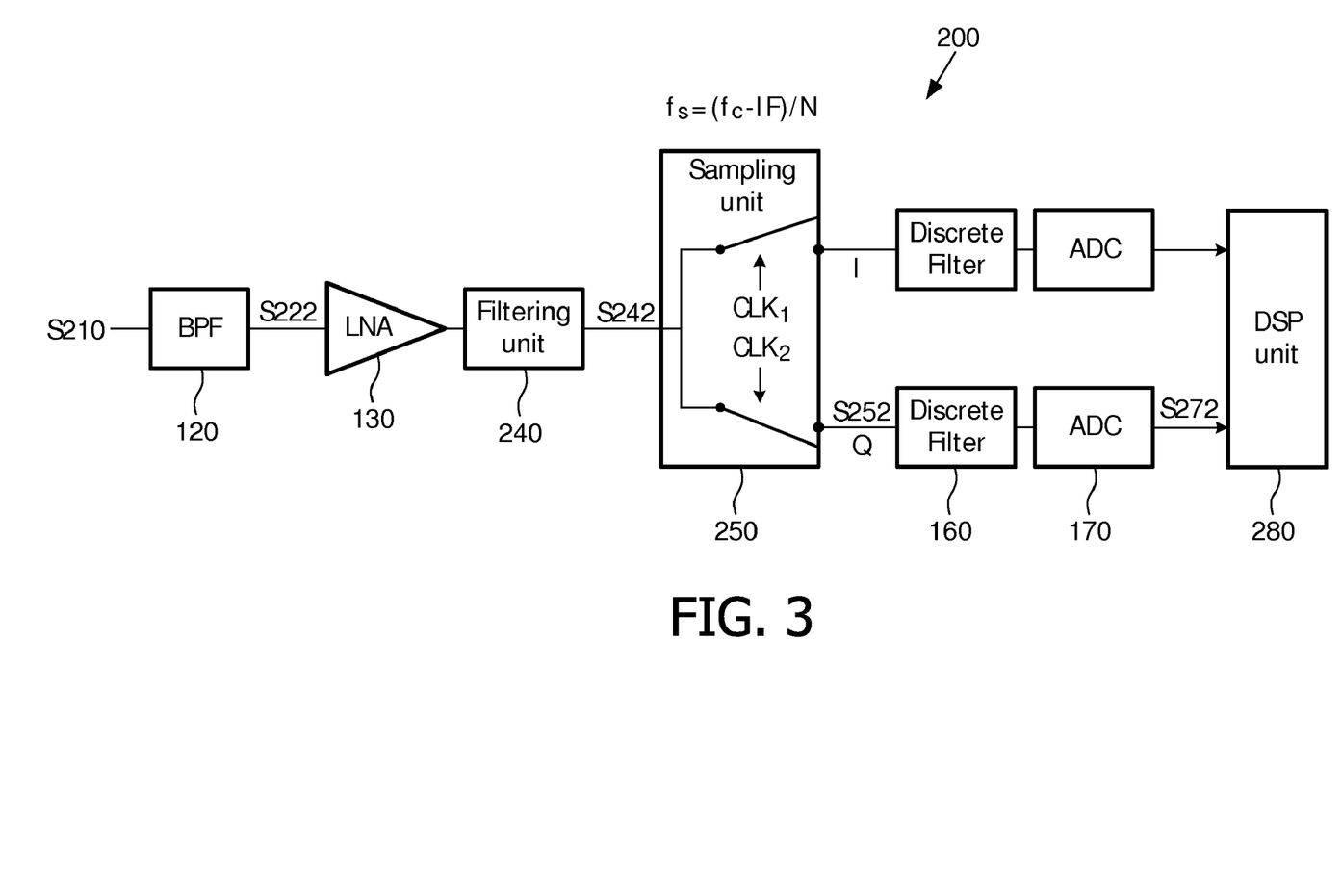
FIG. 3 depicts a block diagram of the first embodiment of the present invention.

FIG. 3 depicts a first embodiment, in which a quadrature sampling is used in the sampling unit 250. The first embodiment shown in FIG. 3 will be described below in detail taken in conjunction with FIGS. 4-7F.

Figure 4:
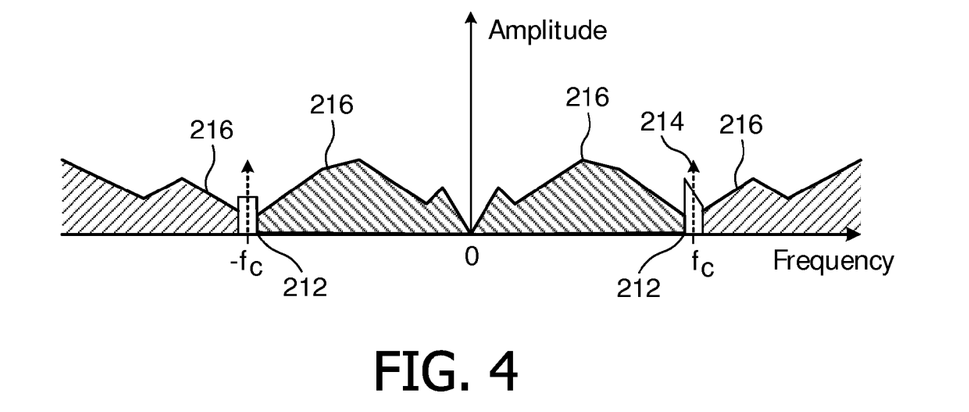
FIG. 4 depicts the spectrum of a RF signal comprising a plurality of interference frequency components and one useful frequency component.

As shown in FIG. 3, in a receiver 200, a RF signal S210 is first received from a signal source such as antenna (not shown), which comprises a plurality of interference frequency components and a useful frequency component, i.e., a modulated useful signal. FIG. 4 depicts the spectrum of the RF signal. In practice, interference is distributed over the entire band at which the RF signal is located. For convenience of illustration, the interference is divided into a plurality of interference frequency components each of which has a certain bandwidth and which may overlap with each other or not, and the certain bandwidth is or isn't equal to that of the useful frequency component depending on specific system design. The useful frequency component is modulated to the frequency band with the center frequency of $f_c$ 214 by the carrier frequency $f_c$ 214, and the interference frequency components 216 are distributed over the entire band.

Figure 5:
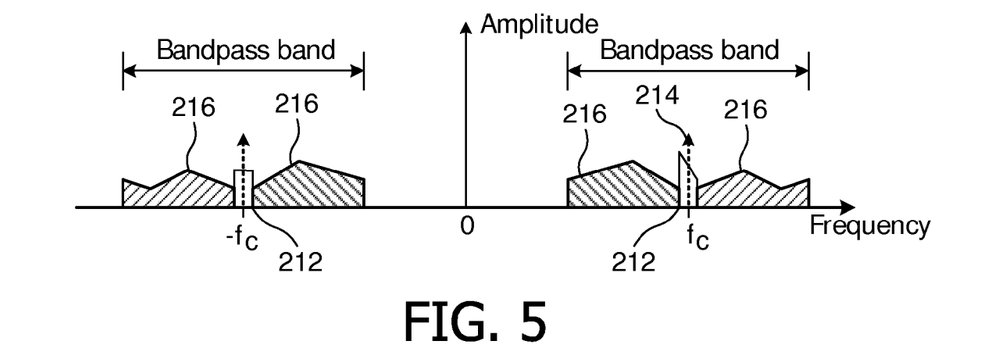
FIG. 5 depicts the spectrum of a RF bandpass signal formed by filtering the RF signal showed in FIG. 4 with BPF.

The RF signal S210 is bandpass filtered by the BPF 120 and transformed into a bandpass-filtered RF signal S222 whose spectrum is depicts in FIG. 5. Since the selection of BPF is not specially limited by the present invention, traditional BPF is still suitable for the receiver using the method and apparatus according to the embodiment of the invention. As show in FIG. 5, the bandpass-filtered RF signal S222 still has a wide bandwidth and a lot of interference frequency components. Some interference frequency components far away from the useful frequency component S212 are greatly suppressed due to bandpass characteristics of the BPF 120, and thus it is not necessary to take them into consideration in subsequent processes.

The bandpass-filtered RF signal S222 is amplified by the LNA 130 and then transferred to the filtering unit 240. The filtering unit 240 may be implemented by a plurality of notch filters. It is to be understood by those skill in the art that other circuits or units suitable for filtering or suppressing a RF signal with a relative narrow bandwidth may be applied to the invention and within the scope thereof. The filtering unit 240 may be also adaptively adjusted to filter out different frequency components based on system requirements.

The RF signal inputted to the filtering unit 240 comprises the useful frequency component S212 and at least one interference frequency component 232 which is located at a predefined band, as well as interference frequency components distributed over other bands. Wherein, the relationship between the center frequency $f_c$ of the useful frequency component and the sampling rate $f_s$ 234 is determined by the equation $f_c = N*f_s + IF$, where N is an integer, IF (Intermediate Frequency) 236 is a predefined intermediate frequency. The selection of N affects the magnitude of the sampling $f_s$ 234. Since $f_c$ is determined by the system and in general not adjustable, the bigger N the lower the sampling rate $f_s$ 234.

Figure 6A:
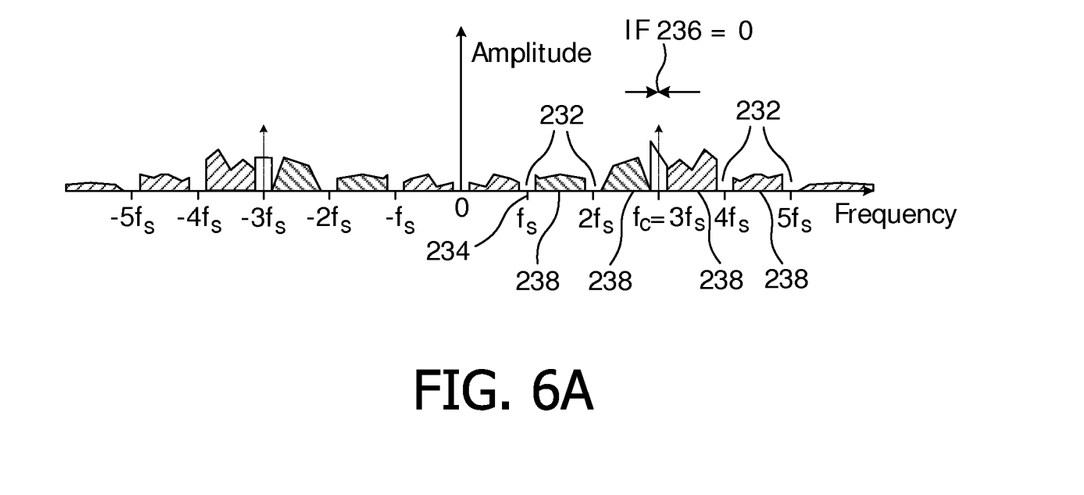
FIG. 6A depicts the spectrum of a notch-filtered RF signal in zero IF receiver.
Figure 6B:
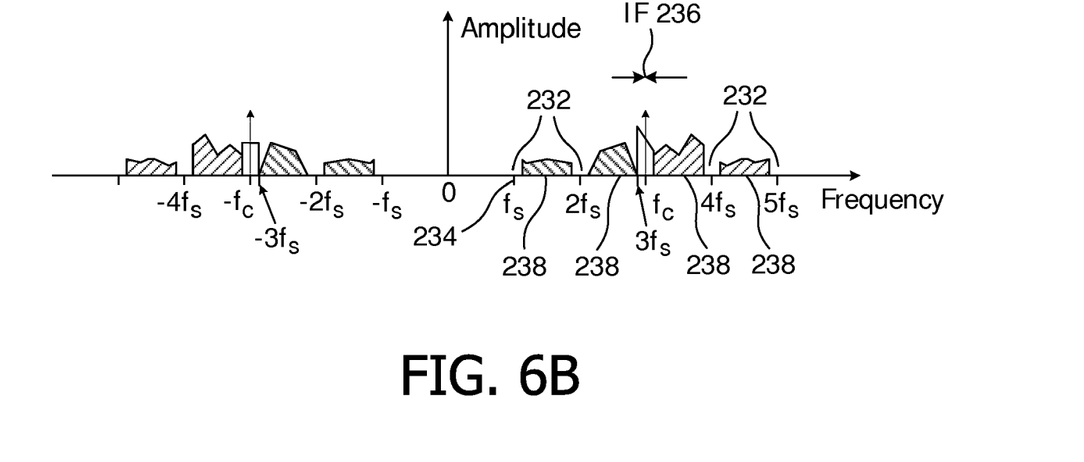
FIG. 6B depicts the spectrum of a notch-filtered RF signal in low IF receiver.

As shown in FIGS. 6A and 6B, the filtering unit 240 filters out some special interference frequency components 232, their center frequencies equal the sum of multiples of the sampling rate 234 and the intermediate frequency IF236, i.e., $f_{filtered}=n*f_s+IF$, where n is an integer which is not equal N. The useful frequency component S232 whose center frequency is $f_{wanted}=f_c=N*f_s+IF$ is not filtered out.

The value of IF236 depends on the design of the receiver. For zero IF receivers, IF236=0. As shown in FIG. 6A, the interference frequency components 232 whose center frequency equal multiples of the sampling rate 234 are filtered out. In the example of FIG. 6A, the center frequency component of the useful frequency component S212 is $f_c=3*f_s$, and two interference frequency components 232 in the bandpass-filtered RF signal S222 whose center frequencies are $2*f_s$ and $4*f_s$ respectively have been filtered out. The bandwidth of those filtered-out interference frequency components depends on the system requirements. Those interference frequency components 238 in the bandpass-filtered RF signal S222 whose center frequencies are not equal to multiples of the sampling rate 234, i.e., $f_{unfiltered} \neq 2*f_s$ or $4*f_s$, are not filtered out. Based on the sampling principle, those interference frequency components 238 which are not filtered out will not be aliased into the useful frequency component S212.

If some out-of-band interferences supposed to be filtered out are still strong enough to affect the useful frequency component S212 due to the poor performance of the BPF 120, it is suggested to filter additional frequency components in these out-of-band interferences. In a practical system, those interference frequency components 238 which do not belong to the bandpass-filtered RF signal S222 can be filtered out by increasing filtering frequency points of the filtering unit 240 such as the notch filters. In FIG. 6A, the interference frequency components 238 whose center frequencies are $f_s$ and $5*f_s$ have been filtered out. If an out-of-band interference is not strong enough to affect the useful frequency component S212 due to the good performance of the BPF 120, it is not necessary to increase additional notch filters.

For the low IF receiver, IF236 is a low frequency with respect to $f_c$ and even approximates the baseband. As shown in FIG. 6B, the interference frequency components 232 whose center frequencies are equal to the sum of a multiple of the sampling rate 234 and IF 236 are filtered out. For example, two interference frequency components 232 whose center frequencies are $2*f_s+IF$ and $4*f_s+IF$ respectively have been filtered out. Those interference frequency components 238 whose center frequencies are not equal to $2*f_s+IF$ or $4*f_s+IF$ are not filtered out.

The filtering unit 240 transforms the bandpass-filtered RF signal S222 into a notch-filtered RF signal 242.

The receiver shown in FIG. 3 employs quadrature sampling, and thus a filtering unit 250 first separates the notch-filtered RF signal S242 into two paths, i.e., I component and Q component, which are sampled respectively by corresponding sampling clocks CLK1 and CLK2 having the same rate but with a phase shift of 90o, the used rate is the sampling rate $f_s$.

From the above description, it can be seen that the RF sampling rate is decreased from $f_s=f_c$ or $f_c-IF$ of the existing RF sampling scheme to $$f_s = \frac{1}{N} * f_c \text{ or } \frac{1}{N} * (f_c - IF)$$

by using the method and apparatus according the invention. The bigger N, the lower the sampling rate $f_s$.

Since only specific interference frequency components need to be filtered out, the number of the required notch filters is limited such that it is practical to implement RF filtering by increasing notch filters without remarkably increase size and complexity of apparatuses. For example, as shown in FIG. 6B, only two notch filters are needed.

A notch-filtered continuous-amplitude and continuous-time RF signal S242 is transformed into a continuous-amplitude and discrete-time discrete analog signal S252 by the sampling process.

Figure 7A:
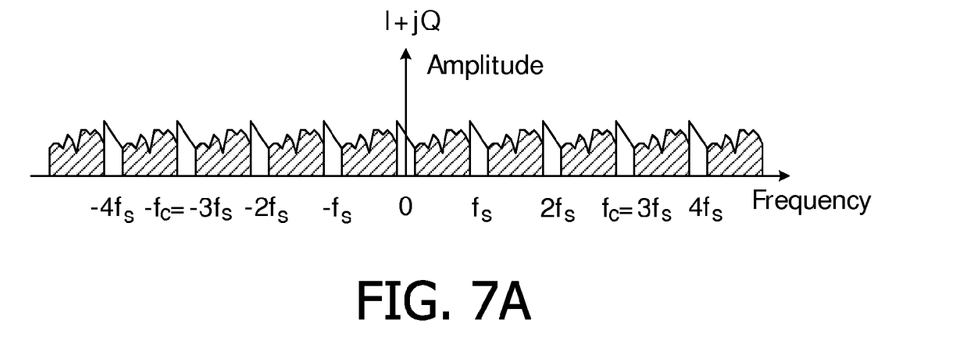
FIG. 7A depicts the spectrum of a discrete analog signal formed by sampling the notch-filtered RF signal shown in FIG. 6A.
Figure 7B:
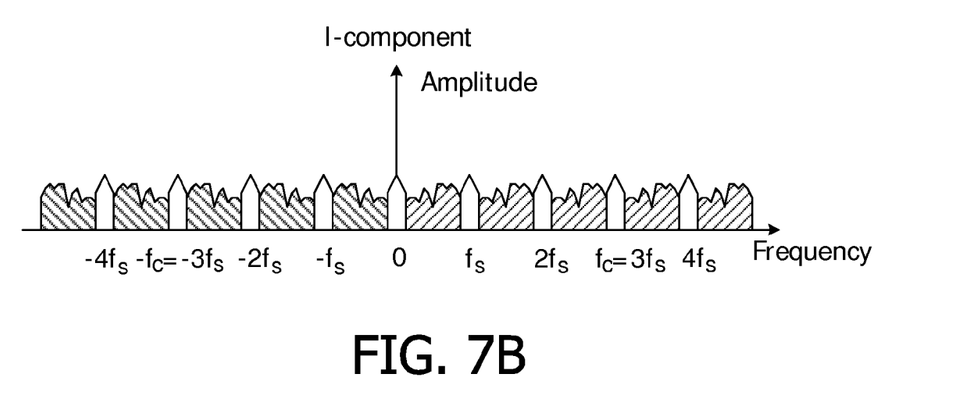
FIG. 7B depicts the spectrum of I component of the discrete analog signal shown in FIG. 7A.
Figure 7C:
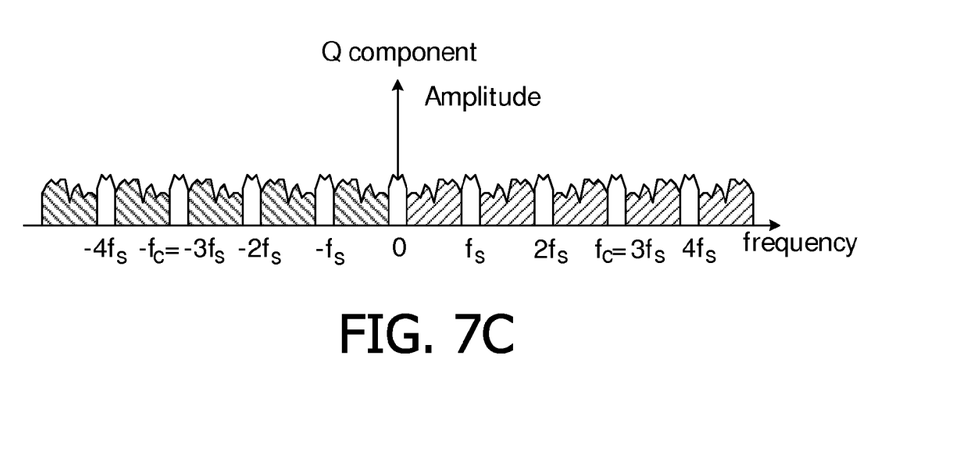
FIG. 7C depicts the spectrum of Q component of the discrete analog signal shown in FIG. 7A.

Corresponding to the notch-filtered RF signal S242 shown in FIG. 6A, FIG. 7A shows the spectrum I+jQ of the corresponding discrete analog signal S252. In a practical system, the real component of I+jQ, i.e. I component, is processed in I path; the imaginary component of I+jQ, i.e. Q component, is processed in Q path. To facilitate understanding, I component and Q component are shown in FIGS. 7B and 7C respectively.

Figure 7D:
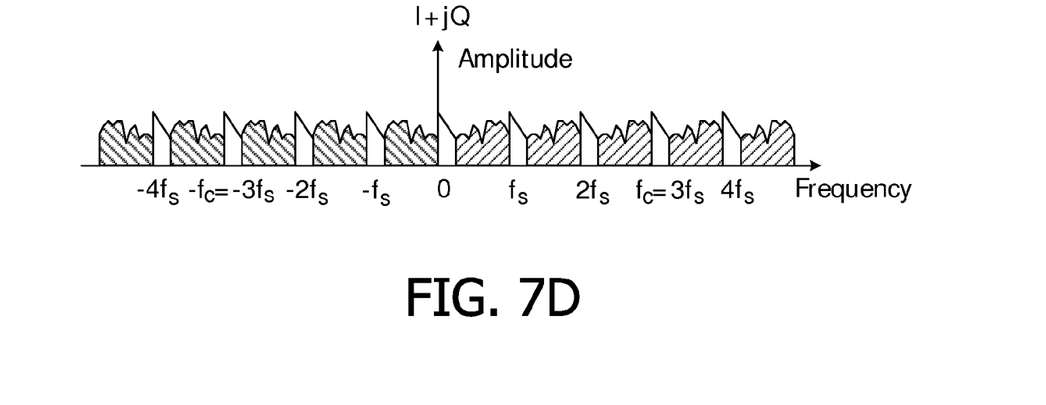
FIG. 7D depicts the spectrum of a discrete analog signal formed by sampling the notch-filtered RF signal shown in FIG. 6B.
Figure 7E:
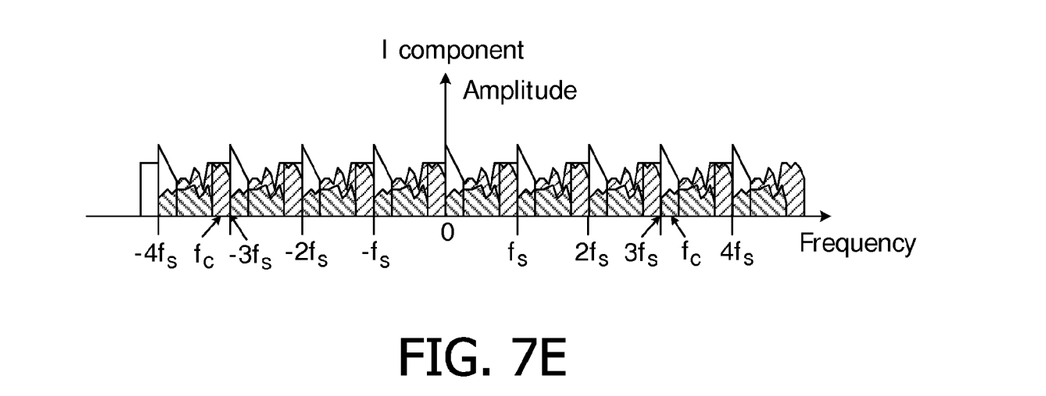
FIG. 7E depicts the spectrum of I component of the discrete analog signal shown in FIG. 7D.
Figure 7F:
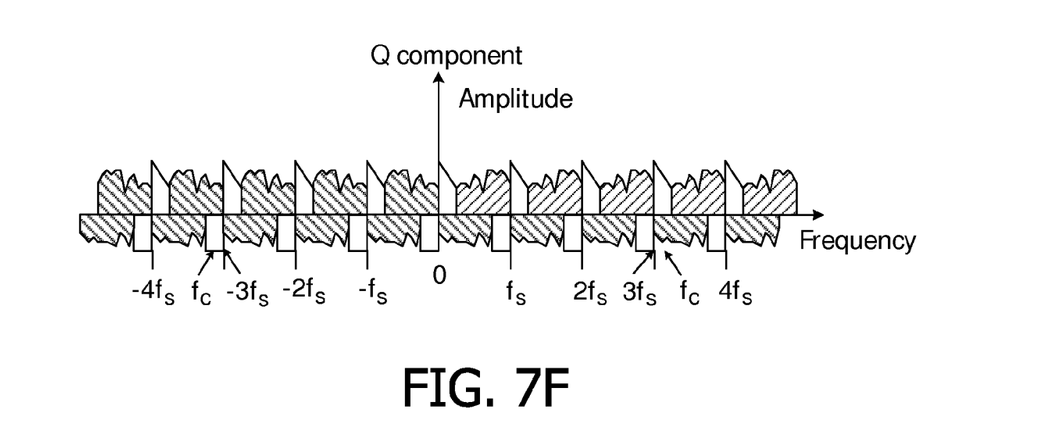
FIG. 7F depicts the spectrum of Q component of the discrete analog signal shown in FIG. 7D.

Corresponding to the notch-filtered RF signal S242 shown in FIG. 6B, FIG. 7D shows the spectrum I+jQ of the corresponding discrete analog signal S252. Similarly, its I component and Q component are shown in FIGS. 7E and 7F respectively.

A subsequent discrete filter 160 compresses out-of-band interferences of the discrete analog signal S252 to improve signal to noise ratio. An analog-to-digital converter ADC 170 transforms the output signal of the discrete analog signal S252 into a discrete-amplitude and discrete-time digital signal S272. The digital signal S272 is processed by a subsequent digital signal processing unit 280.

As compared with the existing RF sampling scheme, the method and apparatus according to the invention greatly decreases the sampling rate from $f_s=f_c$ or $f_c-IF$ to $$f_s = \frac{1}{N} * f_c \text{ or } \frac{1}{N} * (f_c - IF),$$

and thus the power dissipation can be greatly reduced. Since the way of implementing the RF notch filter is simple and the notch filter is small and inexpensive, the RF sampling can be simply and inexpensively achieved by using the method and apparatus according to the invention.

Figure 8:
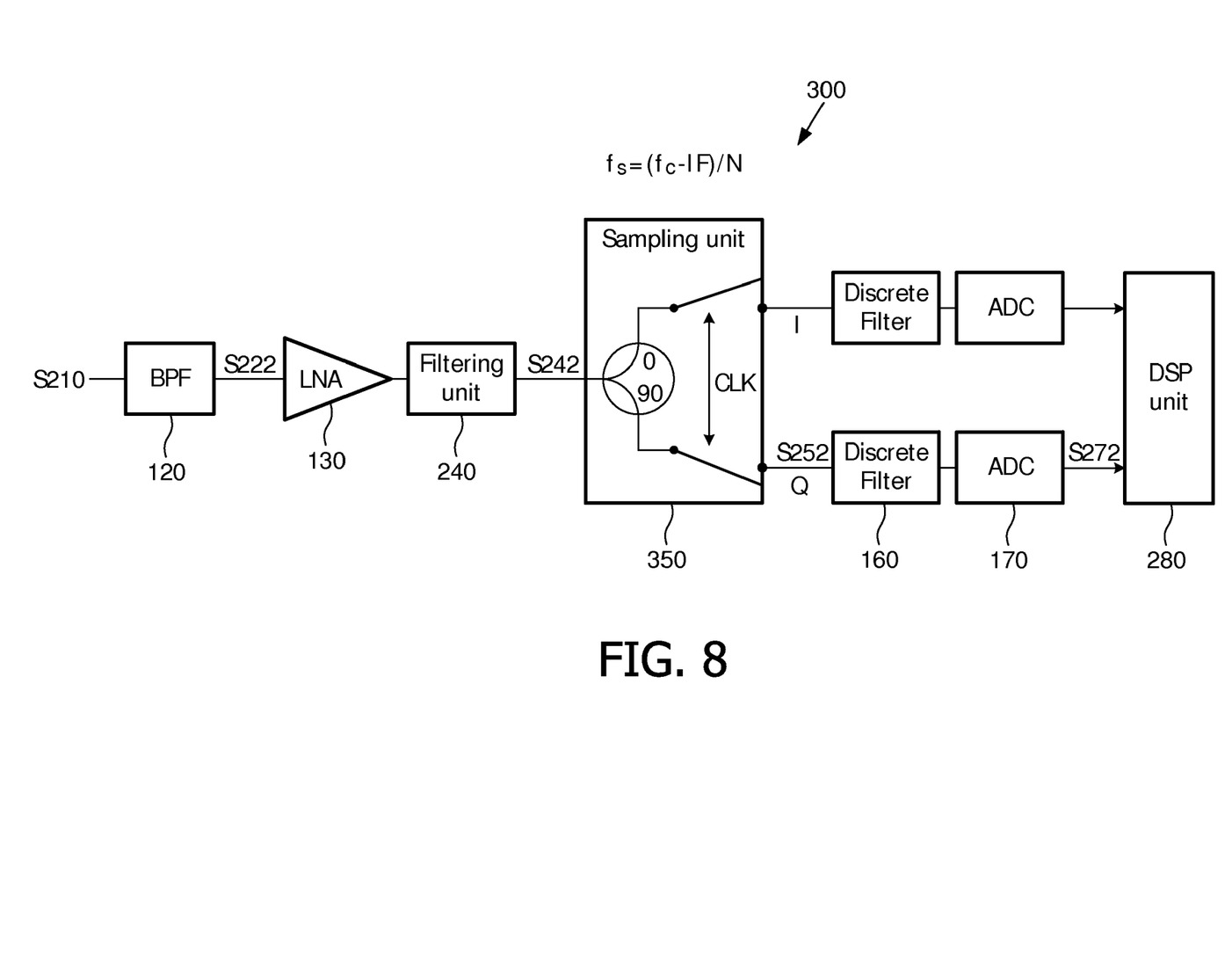
FIG. 8 depicts a block diagram of a receiver according to a second embodiment of the present invention.

FIG. 8 depicts the diagram of a receiver according to a second embodiment of the present invention, which is different from the first embodiment in that a sampling unit 350 separates the notch-filtered RF signal S242 into two paths and performs phase shift on one of them, thus sampling on signals in the two paths can be simultaneously implemented only with a single sampling signal CLK without using two sampling signals CLK$_1$ and CLK$_2$ with a phase shift of 90°.

Figure 9:
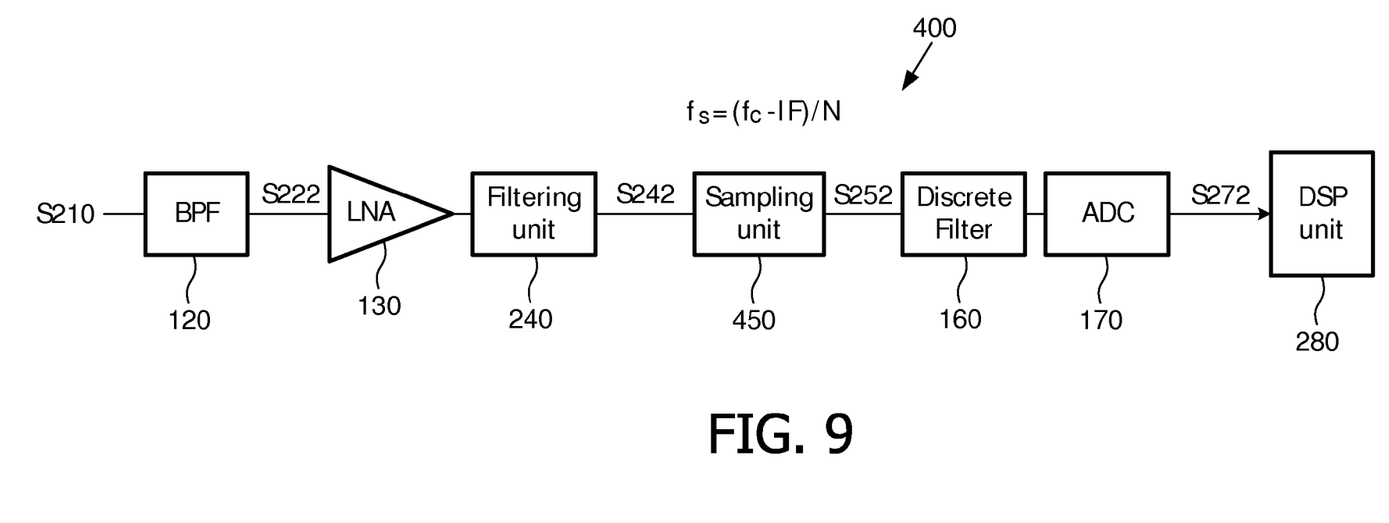
FIG. 9 depicts a block diagram of a receiver according to a third embodiment of the present invention.

As shown in FIG. 9, the method and apparatus according to the invention is not only applied to the quadrature sampling, but also suitable for the sampling of a signal in a single path, and the employed filtering unit 240 can be same as that used in the quadrature sampling in principle and construction. The difference is in that the sampling rate $f_s$ used for a sampling unit 450 is relatively high and has a small selectivity range. However, the power dissipation can be greatly saved, as compared with the existing scheme applied to RF sampling of a signal in a single path.

In the above description, the invention provides a method and apparatus for RF sampling, particularly for greatly decreasing RF sampling rate. Since some interference frequency components have been filtered out before sampling a RF signal, it can be sampled at the sampling rate $$f_s = \frac{1}{N} * f_c \text{ or } \frac{1}{N} * (f_c - IF)$$

much lower than that of the existing scheme in the subsequent sampling process without any loss of information, and the power dissipation can be greatly reduced.

It is to be understood by those skill in the art that the invention provides a method and apparatus for RF sampling, particularly for greatly decreasing RF sampling rate, and various modifications can be devised without departing from the spirit of the invention. Thus, the scope of the invention should be determined by the appended claims.

The invention claimed is:

1. A device for sampling a RF signal comprising a plurality of interference Frequency components and a useful frequency component, comprising:

a filtering unit for filtering out at least one predefined interference frequency component from the RF signal to generate a filtered RF signal;

sampling unit for sampling the filtered RF signal at a predefined sampling rate to generate a time-discrete analog signal, wherein the filtered RF signal is a notch-filtered RF signal and the difference value of a center frequency of the predefined interference frequency component and a predefined intermediate frequency is a multiple of the sampling rate.

2. The device of claim 1, wherein the intermediate frequency is one of a zero frequency and a predefined low IF, wherein the predefined low IF being much lower than the center frequency of the useful frequency component.

3. The device of claim 1, wherein the filtering unit comprises at least one notch filter for filtering out the one predefined interference frequency component.

4. The device of claim 1, further comprising:

a bandpass filter for bandpass filtering the RF signal to generate a bandpassfiltered RF signal comprising the useful frequency component and the at least one predefined interference frequency components; and a low noise amplifier for amplifying the bandpass-filtered RF signal to generate an amplified bandpass-filtered RF signal and transferring the amplified bandpassfiltered RF to the filtering unit.

5. The device of claim 1, further comprising:

a discrete filter for suppressing out-of-band interferences of the discrete analog signal to generate a filtered discrete analog signal;

an analog-to-digital converter for transforming the filtered discrete analog signal into a digital signal.

6. A receiver for use in a wireless communication network, comprising:

a RF sampling unit for sampling a RF signal comprising a plurality of interference frequency components and a useful frequency component, wherein the RF sampling unit further comprises:

a filtering unit for filtering out at least one predefined interference frequency component from the RF signal to generate a filtered RF signal;

a sampling unit for sampling the filtered RF signal at a predefined sampling rate to generate a time discrete analog signal, wherein the filtered RF signal is a notch-filtered RF signal and the difference value of a center frequency of the predefined interference frequency component and a predefined intermediate frequency of a multiple of the sampling rate;

a discrete filter for suppressing out-of-band interferences of the discrete analog signal to generate a filtered time discrete analog signal;

an analog-to-digital converter for transforming the filtered discrete analog signal into a digital signal;

a digital signal processing unit for processing the digital signal.

7. The receiver of claim 6, wherein the intermediate frequency is one of a zero frequency and a predefined low IF, wherein the predefined low IF being much lower than the center frequency of the useful frequency component.

8. A method for sampling a RF signal comprising a plurality of interference frequency components and a useful frequency component, the method comprising:

a) filtering out at least one predefined interference frequency component from the RF signal to generate a filtered RF signal;

b) sampling the filtered RF signal at a predefined sampling rate to generate a time-discrete analog signal wherein the filtered RF signal is a notch-filtered RF signal and the difference value of a center frequency of the predefined interference frequency component and a predefined intermediate frequency is a multiple of the sampling rate.

9. The method of claim 8, wherein the intermediate frequency is one of a zero frequency and a predefined low IF, wherein the predefined low IF being much lower than the center frequency of the useful frequency component.

10. The method of claim 8, wherein in the step a) using at least one notch filter to filter out the one predefined interference frequency component.

11. The method of claim 8, further comprising:

c) performing bandpass filtering on the RF signal to suppress out-of-band interferences of the useful frequency component to generate a bandpass-filtered RF signal;

d) amplifying the bandpass-filtered RF signal to be used for filtering process of the step a).

12. The method of clam 8, further comprising:

c) filtering the time-discrete analog signal to generate a filtered time discrete analog signal;

d) performing analog and digital converting on the filtered discrete analog signal to generate a digital signal.

* * * * *

UNITED STATES PATENT AND TRADEMARK OFFICE
CERTIFICATE OF CORRECTION

PATENT NO. : 8,170,521 B2
APPLICATION NO. : 12/162175
DATED : May 1, 2012
INVENTOR(S) : Xuecheng Qian It is certified that error appears in the above-identified patent and that said Letters Patent is hereby corrected as shown below:

On the Title Page, Item (57) in the Abstract, line 3, please delete "for greatly decrease" and insert --that greatly decreases--

In the Specification
In Column 2, line 15, please delete "for greatly decrease" and insert --that greatly decreases--
In Column 3, line 3, please delete "scheme" and insert --schemes--
In Column 3, line 15, please delete "existed" and insert --existing--

Signed and Sealed this
Nineteenth Day of November, 2013

Teresa Stanek Rea
*Deputy Director of the United States Patent and Trademark Office*